United States Patent Office 3,637,665
Patented Jan. 25, 1972

3,637,665
PROCESS FOR THE PREPARATION OF HIGH DENSITY N,N' - DIBENZYL-ETHYLENEDI-AMINE BIS[D(—) - α - AMINOBENZYLPENI-CILLIN]
Arthur C. Adams, deceased, late of West Chester, Pa., by Mary Adams, administratrix, West Chester, Pa., assignor to American Home Products Corporation, New York, N.Y.
No Drawing. Filed Feb. 9, 1970, Ser. No. 10,050
Int. Cl. C07d 99/20
U.S. Cl. 260—239.1      4 Claims

ABSTRACT OF THE DISCLOSURE

This invention concerns a process for the preparation of N,N' - dibenzylethylenediamine bis[D(—) - α - aminobenzylpenicillin] of high purity and density which is useful in the preparation of pharmaceutically elegant antibiotic dosage forms.

This invention concerns a new and novel form of N,N'-dibenzylethylenediamine bis[D(—) - α - aminobenzylpenicillin]. In particular, it is concerned with a process for the preparation of N,N'-dibenzylethylenediamine bis[D(—)-α-aminobenzylpenicillin] which has a high purity and density and is, therefore, useful in the preparation of pharmaceutically elegant dosage forms.

The new and novel material of the present invention is N,N' - dibenzylethylenediamine bis[D(—) - α - aminobenzylpenicillin] having an apparent density of about 0.5 to about 0.7. As employed herein the term "apparent density" is as defined in "Remington's Practice of Pharmacy," Twelfth Edition, 1961 by Martin and Cook, published by Mack Publishing Company, at page 94:

$$\text{Apparent Density} = \frac{\text{Mass in grams (in air)}}{\text{Volume in cubic centimeters}}$$

Therefore, for example, when the product of the present invention is said to have an apparent density of 0.5, it is meant that every gram of material will occupy a volume of about two cubic centimeters.

The new and novel process of the present invention comprises slowly adding, e.g. perferably over a period of about one hour, a solution comprised of two to about four parts of water and one part of about equimolar amounts of D(—)-α-aminobenzylpenicillin and an amine selected from the group consisting of diethylamine and triethylamine to about an equal volume of a solution comprised of water and an amount of an acid salt of dibenzylethylenediamine which is about one-half the molar amount of D(—)-α-aminobenzylpenicillin employed. Preferably this process is conducted using dibenzylethylenediamine diacetate.

When the above process is complete, the high density N,N'-dibenzylethylenediamine bis[D(—)-α-aminobenzylpenicillin] is separated by conventional procedures. For example, the precipitated high density product is filtered, washed with water and dried. The product prepared in this manner is obtained in high yields, of high purity and has an apparent density of from about 0.5 to about 0.7.

Conversely, if the above process is conducted, so that, the aqueous solution of a dibenzylethylenediamine acid salt is added to the aqueous solution containing the penicillin and the amine, the resulting N,N'-dibenzyl-ethylenediamine bis[D(—)-α-aminobenzylpenicillin] is bulky and fluffy and will have an apparent density of about 0.3. Although this latter material is pharmacologically efficacious as an antibiotic, it is relatively unsuitable for the preparation of pharmaceutically elegant dosage forms.

The starting materials employed in the above-described process are all commercially available or are readily prepared by procedures well known in the chemical art. As employed herein the term "acid salt of dibenzylethylenediamine" is meant to include those salts that are formed with any acceptable acids. Such acids are well known in the art, for example, hydrochloric, hydrobromic, sulfuric, nitric, phosphoric, acetic, benzenesulfonic, toluenesulfonic, methylsulfonic, ethylsulfonic acids and the like. These salts may be prepared by procedures commonly employed in the art, for example, reacting N,N' - dibenzylethylenediamine with two equivalents of the selected acid in aqueous solution and then concentrating the solution. The new and novel high density N,N'-dibenzylethylenediamine bis[D(—) - α - aminobenzylpenicillin] of the present invention in standard and accepted tests have exhibited activity against gram-positive and gram-negative bacteria. In this regard, this material is, therefore, of value as an antibacterial agent. In particular, the high density penicillin of this invention is of particular value in the preparation of pharmaceutically elegant dosage forms. For example, the high density penicillin of this invention can be encapsulated in capsules which are approximately one-half the size of the capsule necessary to contain the corresponding fluffy material. Further, smaller tablets can be prepared with this high density material. These smaller capsules and tablets are of great advantage for dosage purposes, in that, a subject is not inconvenienced by having to orally ingest large capsules or tablets. Still further, this high density material is advantageously employed in the dry filling of ampules for aqueous reconstitution before parenteral administration. In this regard, smaller ampules are required to package the dry material and a smaller volume of water will be required to reconstitute the injectable product.

The following examples are given by way of illustration.

EXAMPLE I

Anhydrous D(—) - α - aminobenzylpenicillin (92.6 g.; 0.265 mole) in 300 ml. of water is treated with 19.5 g. (0.266 mole) of diethylamine with stirring and the resulting solution is clarified by filtration. In another vessel, 48.2 g. (0.133 mole) of N,N'-dibenzylethylenediamine diacetate is dissolved in 300 ml. of water and the solution is clarified by filtration.

The D(—)-α-aminobenzylpenicillin solution is added at 20–25° C. over one hour to the dibenzylethylenediamine solution with slow stirring. When the addition is complete, the mixture is allowed to stir for an additional hour at room temperature. The white, granular product is collected by filtration, washed two times with 100 ml. of water and dried overnight in a vacuum oven at 45–50° C.

The yield of N,N'-dibenzylethylenediamine bis[D(—)-α-aminobenzylpenicillin] is 115 g. or 90% of theory calculated on an anhydrous basis (Karl Fischer water, 2.8%); purity by iodometric assay, 97%; and purity by bioassay, 97%. This product has an apparent density of 0.62 or a volume of 1.6 cc. per 1.0 g. of material.

After pulverizing a sample of this product and passing it through a screen at 250 microns, the apparent density is 0.64.

When the above procedure is repeated replacing the 19.5 g. of diethylamine with 26.9 g. of triethylamine, the resulting product is obtained in a 91% yield and has an apparent density of 0.54 or a volume of 1.9 cc. per 1.0 g. of material.

EXAMPLE II

Anhydrous D(—)-α-aminobenzylpenicillin (92.6 g.; 0.265 mole) in 300 ml. of water is treated with 19.5 g. (0.266 mole) of diethylamine with stirring and the resulting solution is clarified by filtration. In another vessel, 48.2 g. (0.133 mole) of N,N'-dibenzylethylenediamine diacetate is dissolved in 300 ml. of water and the solution is clarified by filtration.

The dibenzylethylenediamine solution is added at 20–25° C. over one hour to the D(—)-α-aminobenzylpenicillin solution with slow stirring. When the addition is complete, the mixture is allowed to stir for an additional hour at room temperature. The white product is collected by filtration, washed two times with 100 ml. of water and dried overnight in a vacuum oven at 45–50° C. The N,N'-dibenzylethylenediamine obtained in this manner has an apparent density of 0.37 or a volume of 2.7 cc. per 1.0 g. of material.

EXAMPLE III 46.3 g. (0.133 mol.) of anhydrous D(—)-α-aminobenzylpenicillin is dissolved in 150 ml. of water and 13.7 ml. (9.72 g., 0.133 mol.) of diethylamine with stirring. In another 150 ml. of water 24.1 g. (0.067 mol.) of dibenzylethylenediamine diacetate is dissolved.

The D(—)-α-aminobenzylpenicillin solution is slowly added in a thin stream to the stirring dibenzylethylenediamine diacetate solution. When the addition is complete, the stirring is continued at room temperature for one hour. Thereafter, the precipitate is collected on a Buchner funnel, washed two times with 50 ml. of water and dried in an oven at 55–60° C. for twelve hours to afford crystalline, N,N'-dibenzylethylenediamine bis[D(—)-α-aminobenzylpenicillin] (55.2 g.; 87.8%); iodometric assay, 649 mcg./mg.; bioassay 632 mcg./mg.; Karl Fischer water 3.93%, which corresponds to the dihydrate (3.7% water); theoretical potency of the dihydrate is 718 mcg./mg.; the apparent density of this product is 0.545 or a volume of 3.7 cc. per 2.0 g.

EXAMPLE IV 92.6 g. of anhydrous D(—)-α-aminobenzylpenicillin is dissolved in 300 ml. of water and 27.4 ml. of diethylamine with stirring while 48.2 g. of dibenzylethylenediamine diacetate is dissolved in other 300 ml. of water.

The dibenzylethylenediamine solution is added in a thin stream to the stirring D(—)-α-aminobenzylpenicillin solution. When the addition is complete, the stirring is continued for one hour at room temperature. Thereafter, the precipitate is collected on a Buchner funnel, washed twice with 100 ml. of water and dried in an oven at 55–60° C. for twelve hours to afford crystalline N,N'-dibenzylethylenediamine bis[D(—)-α-aminobenzylpenicillin] having an apparent density of 0.312 or a volume of 6.4 cc. per 2.0 g.

When the above product is dried overnight in a vacuum oven the apparent density remains unchanged.

What is claimed is:

1. A process for the preparation of N,N'-dibenzylethylenediamine bis[D(—)-α-aminobenzylpenicillin] having an apparent density of about 0.5 to about 0.7 which comprises:
    (a) slowly adding a solution comprised of about two to about four parts of water and about one part of equimolar amounts of D(—)-α-aminobenzylpenicillin and an amine selected from the group consisting of diethylamine and triethylamine,
    (b) to about an equal volume of a solution comprised of water and an amount of an acid salt of dibenzylethylenediamine which is about one-half the molar amount of D(—)-α-aminobenzylpenicillin employed.

2. A process as described in claim 1 wherein the acid salt of dibenzylethylenediamine employed is the diacetate.

3. A process as described in claim 1 for the preparation of N,N'-dibenzylethylenediamine bis[D(—)-α-aminobenzylpenicillin] having an apparent density of about 5.5 to about 6.5 which comprises:
    (a) slowly adding a solution comprised of three parts of water and one part of equimolar amounts of D(—)-α-aminobenzylpenicillin and an amine selected from the group consisting of diethylamine, and triethylamine,
    (b) to an equal volume of an aqueous solution containing dibenzylethylenediamine diacetate in one-half the molar concentration of the D(—)-α-aminobenzylpenicillin employed.

4. A process as described in claim 1 for the preparation of N,N'-dibenzylethylenediamine bis[D(—)-α-aminobenzylpenicillin] having an apparent density of about 6.5 which comprises:
    (a) adding over a period of about one hour, an aqueous solution containing three parts of water and one part of equimolar amounts of D(—)-α-aminobenzylpenicillin and diethylamine,
    (b) to an equal volume of an aqueous solution containing dibenzylethylenediamine diacetate in one-half the molar concentration of the D(—)-α-aminobenzylpenicillin employed.

References Cited

UNITED STATES PATENTS 2,985,648   5/1961   Doyle et al. _____ 260—239.1

NICHOLAS S. RIZZO, Primary Examiner

U.S. Cl. X.R.

424—271